(12) United States Patent
Rosendahl

(10) Patent No.: US 8,333,291 B2
(45) Date of Patent: Dec. 18, 2012

(54) HOUSING FORMED FROM EXTRUDED PANELS

(76) Inventor: Dean R. Rosendahl, Elie (CA)

( * ) Notice: Subject to any disclaimer, the term of this patent is extended or adjusted under 35 U.S.C. 154(b) by 242 days.

(21) Appl. No.: 12/836,657

(22) Filed: Jul. 15, 2010

(65) Prior Publication Data

US 2012/0015553 A1 Jan. 19, 2012

(51) Int. Cl.
*B65D 6/26* (2006.01)
(52) U.S. Cl. .............. 220/4.11; 220/4.02; 220/691
(58) Field of Classification Search ............ 220/4.11, 220/690, 691, 475, 4.02
See application file for complete search history.

(56) References Cited

U.S. PATENT DOCUMENTS

| | | | |
|---|---|---|---|
| 3,588,027 A * | 6/1971 | Bowden | 249/48 |
| 3,596,427 A | 8/1971 | Fernandez et al. | |
| 4,338,653 A | 7/1982 | Marrero | |
| 4,411,116 A | 10/1983 | Mailard | |
| 4,551,792 A | 11/1985 | Hoke | |
| 4,673,087 A * | 6/1987 | Webb | 206/600 |
| 4,858,088 A | 8/1989 | Agabekov | |
| 5,031,083 A | 7/1991 | Claesson | |
| 5,461,299 A | 10/1995 | Bruni | |
| 5,521,838 A | 5/1996 | Rosendahl | |
| 5,681,095 A * | 10/1997 | Martin | 298/22 R |
| 6,032,432 A | 3/2000 | Patti | |
| 7,642,670 B2 | 1/2010 | Rosendahl | |
| 2004/0076013 A1* | 4/2004 | Tseng | 362/431 |
| 2008/0041623 A1* | 2/2008 | Makwinski et al. | 174/481 |

FOREIGN PATENT DOCUMENTS

| | | |
|---|---|---|
| DE | 34223967 | 6/1984 |
| GB | 1361805 | 9/1971 |
| JP | 11026115 | 7/1997 |

* cited by examiner

*Primary Examiner* — Stephen Castellano
(74) *Attorney, Agent, or Firm* — Adrian D. Battison; Ade & Company Inc.

(57) ABSTRACT

A joint for a housing for electrical components has a series of extruded panels connected edge to edge. The first edge includes a slot defined by an inner wall and an outer wall and the second edge includes a blade inserted into the slot, the blade and the flexible wall including cooperating shoulders. The blade and slot are at an angle to the outer surface where a rib engages into an outer recess to seal the outer surface at the joint. A bridging member spans the joint to prevent spreading, while locking the flexible wall and carrying internal components. The housing can form a post or a receptacle on top of the post. The bridging members connect to end plates by screws extending though the plates so as to form an internal structure for the housing. Some of the connected panels can include cooling fins forming a cooling duct.

33 Claims, 18 Drawing Sheets

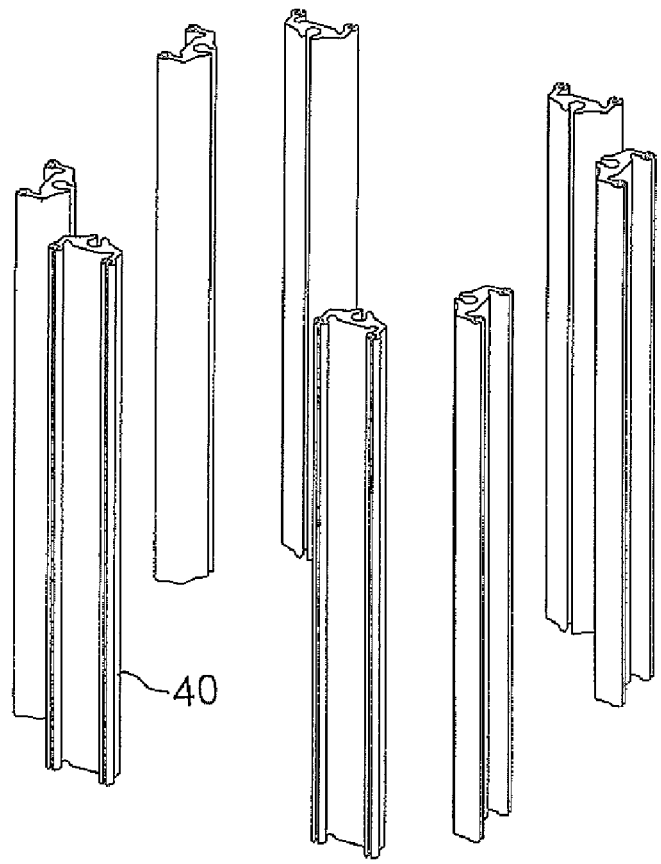
FIG. 18
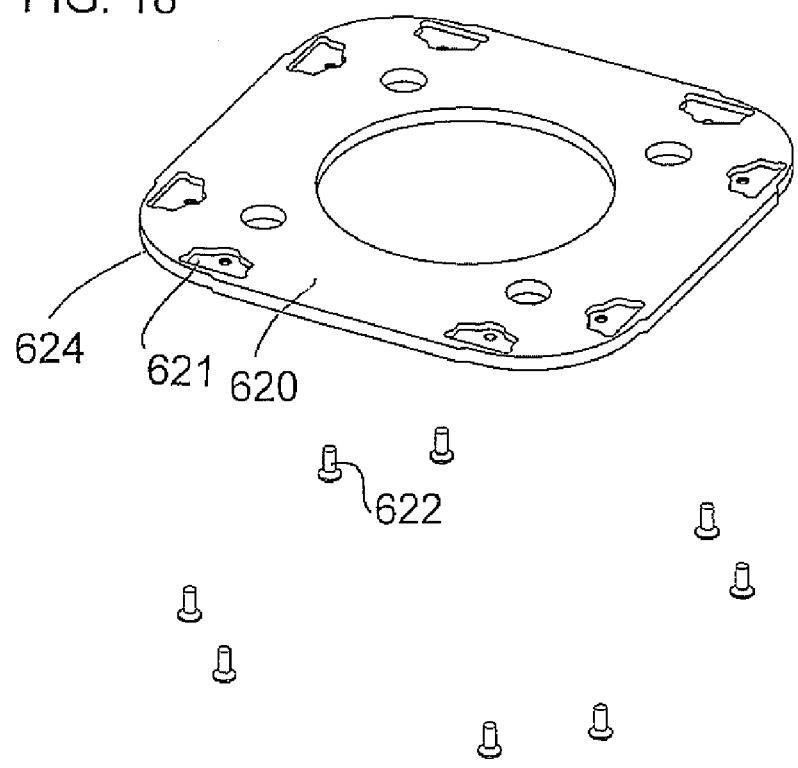

HOUSING FORMED FROM EXTRUDED PANELS

This invention relates to a housing formed from connecting extruded panels edge to edge.

BACKGROUND OF THE INVENTION

In U.S. Pat. No. 5,521,838 issued May 28, 1996 of Glenn Rosendahl is disclosed a micro processor controlled system is provided for supplying electrical power to a plurality of electrical outlets for example for use in a parking lot. A central power supply communicates with a series of outlet receptacles each arranged to supply electrical power. Each receptacle has its own micro processor controlled control unit which is arranged to control the supply of power to the receptacle. A detector unit detects the insertion of a connector plug to the receptacle and actuates a comparator which compares the instantaneous current drawn by the load with a predetermined variable maximum current and allows that current to be drawn only if it is less than the maximum. In the event that the maximum is exceeded, the load is disconnected and is only allowed to be reconnected after the connector plug is removed. A thermostat can be used to control the supply of power depending upon the outside temperature. The microprocessors can select a part only of a cycle for supplying power so that the total power drawn by the central power supply is reduced.

In U.S. Pat. No. 7,642,670 issued Jan. 5, 2010, the present inventor provided additional features of an arrangement of the above type and disclosed a system for supplying electrical power to a plurality of vehicles from a central power supply through a plurality of electrical outlets includes an outlet control unit for each of the outlets and a vehicle control unit for each of the vehicles. The outlet microprocessor switches the supply of power to the outlet to communicate data to the vehicle. The vehicle microprocessor communicates data by switching a load across the power supply to provide interaction between the microprocessors to manage requirement and availability of power. The data includes whether the power plant of the vehicle is gasoline powered, diesel powered, hybrid or electric battery powered. The microprocessor of the vehicle control unit is arranged to control switches which supply power to selected loads in the vehicle and includes an interface which is arranged to connect to a Canbus communication system of the vehicle.

These arrangements require a suitable housing to locate the electrical components and to provide a support for the outlet receptacle by which the vehicle may be attached to the electrical supply. The housing should be resistant to environmental conditions and provide a suitable structure which can be readily mounted in place.

U.S. Pat. No. 6,032,432 (Patti) issued Mar. 7, 2000 discloses a modular panel for light fixtures. The modular panel includes elongated extruded panels of different shapes including a corner panel with a curved cross section and a flat side panel. The side edges of the corner panel include a pair of spaced-apart lips defining an elongated slot for accommodating a co-operating side edge of an adjacent side panel for a tongue-in-groove connection. The corner panel has evenly spaced fins along the surface to provide structural integrity as well as to scatter light passing through the panel. Multiple panels being assembled with adjacent intermediate adjoining panels forming a housing having a closed cross section U.S. Pat. No. 4,858,088 (Agabekov) issued Aug. 15, 1989 discloses an elongated lighting device having a housing with a bottom, two lateral wings, a longitudinally elongated opening adapted to receive a transparent closure, and an electric supply bar mounted on the bottom in the interior of the housing, so as to be enclosed between the lateral wings and to be placed in front of the elongated opening, the electric supply bar having at least one insulating support element whereon a succeeding series of electric contact pairs is mounted and which pairs are each destined to receive the connection contacts at the ends of a current consuming element such as a tubular electric lamp. A top cover is snap fastened at side edges onto the bottom section.

U.S. Pat. No. 5,031,083 (Claesson) issued Jul. 9, 1991 discloses an arrangement for open profile lengths intended to permit them to be connected together to produce a channel structure which is closed around its periphery. Two profile lengths of identical execution are connected together to produce a closed channel structure, each of which has its own flange with the desired external form and a number of connecting elements projecting from a common base are so arranged, with their channel-shaped spaces facing towards one another, as to be connected together through the interaction between the flanges and connecting elements in a tongue and groove connection.

U.S. Pat. No. 4,338,653 (Marrero) issued Jul. 6, 1982 discloses a fluorescent lighting fixture having a housing which will flush mount in either a corner or on a wall or ceiling surface, there being a recessed track in the back into which mounting plates slide. The front of the housing is adapted to accept either a translucent shield for direct lighting or an opaque reflector apparatus spaced somewhat from the housing for indirect lighting. The front reflector is snap fastened in place by a center snap and two edge tongue and groove connectors.

U.S. Pat. No. 4,551,792 (Hoke) issued Nov. 5, 1985 discloses an exterior post top mounted lighting fixture with a housing formed by four extruded right-angled aluminum members interlocked together, the housing providing means for aligning an electrical assembly and the components thereof in a predetermined position.

U.S. Pat. No. 3,596,427 (Bayamon) issued Aug. 3, 1971 discloses channel-shaped posts portions connected together by flanges interfitting with each other and joined by a plug wedge forced into the ends of the posts between the webs and flanged thereof and concealed inside. The plug wedges are designed to co-act with the webs and flanges of the posts in such manner that interlocking tongue and groove connections between the flanges of one channel-shaped post and the flanges of the other channel-shaped post so co-act with each other that the two posts form a single substantially rectangular post.

SUMMARY OF THE INVENTION

It is one object of the invention to provides a housing formed from connected extruded panels.

According to one aspect of the invention there is provided a housing comprising:

a plurality of extruded panels arranged side by side for connection at side edges;

each of the panels having a male connection member along a first side edge and a female connection member along a second side edge;

the male connection member being a snap fastening into the female connection member by insertion in a direction at right angles to the edges to form a joint therebetween;

the panels cooperating to form an enclosure defined by the panels for surrounding the electrical components.

The housing described herein is primarily designed for housing electrical components where protection from the environment is required, particularly where the components are to be mounted externally such as on a post or other ground support. This arrangement is particularly suitable where the electrical components provide a controlled electrical outlet for supplying current to a load such as a vehicle. However the device can also be used, not only for the automotive industries, but also the Recreational Vehicle (RV) and Marine industries, which are known to include hook-up for a water connection, telephone, cable and Internet, and even perhaps natural gas. Thus the housing may contain components for supplying any one or more of these utilities.

Preferably the housing includes panels of different cross section. This is particularly useful where the housing forms part of a system including different types of panes which can be selected for connection edge to edge to form different shape housings for different locations and for containing different components. Thus the system may include the panels themselves together with further components which cooperate with the panels to form the different structures.

Thus some of the panels may be generally straight in cross section and some of the panels may be generally curved in cross section. Some may include flat outer surface positions. Some may include cooling fins. Some may include corners both external and internal. These can be selected and joined to make the different arrangements of housing as required.

Preferably, in order to allow this selection and connection, the male connection members of each of the panels are of identical cross section and the female connection members of each of the panels are of identical cross section.

Preferably the panels are formed of an extruded metal to provide a suitable level of strength and resistance to the environment, such as mid steel, stainless steel or aluminum. However other plastics materials can be used.

Preferably there is provided a plurality of bridging members each bridging the panels at a respective one of the joints between panels and the panels each include a receptacle for receiving insert portions of the bridging member such that the bridging member bridges the joint inside an inside surface of the housing to hold the joint against spreading.

Preferably the bridging member extends substantially along the full length of the panels. However it can be shorter and used typically at the ends only.

Preferably the bridging member slides into place along the panels in the form of a zip lock.

Preferably the bridging member forms a support for components located inside the panels.

Preferably the bridging member is connected at one end to a support member such as a base plate or end plate extending generally at right angles to the panels so as to provide a connection between the panels and the plate. There can also be provided two end plates so that the two end plates and the bridging members form a supporting structure inside the panels.

Preferably the bridging member is fastened to the end plate by a screw through the support member engaging into a channel extending longitudinally of the bridging member.

Where cooling of the electrical components in a hot environment is desirable, at least one of the panels can carry a plurality of cooling fins extending generally outwardly therefrom, either to an inwardly facing side or to an outwardly facing side depending on the require construction.

Preferably the panels are arranged connected edge to edge such that the cooling fins form part of a cooling duct extending along the housing.

For example, two or more of the panels may form a cooling duct located inside an outer housing with the housing being formed by respective ones of the panels.

In one example the panels are connected to form an upstanding elongate post.

In one example the panels are connected to form a receptacle on top of a post. In this case the post may also be formed from the panels or may be of a conventional construction.

In another example some of panels may have exterior slots to receive edges of a slidable face panel. In this case some of panels may be shaped so that they are generally concave so as to form an interior recess.

In another example at least one of the panels has an opening for receiving an electrical outlet receptacle.

According to a second aspect of the invention there is provided a housing for electrical components comprising:

a plurality of extruded panels arranged side by side for connection at side edges;

the panels being connected by longitudinal joints at the side edges to form an enclosure defined by the panels for surrounding the electrical components;

wherein there is provided a plurality of bridging members each bridging the panels at a respective one of the joints between panels such that the bridging member bridges the joint inside an inside surface of the housing to hold the joint against spreading;

and wherein the bridging member is connected at one end to a support member extending generally at right angles to the panels so as to provide a connection between the panels and the support member.

According to a third aspect of the invention there is provided a housing for electrical components comprising:

a plurality of extruded panels arranged side by side for connection at side edges;

the panels being connected by longitudinal joints at the side edges to form an enclosure defined by the panels for surrounding the electrical components;

wherein at least one of the panels carries a plurality of cooling fins extending generally outwardly therefrom;

and wherein the panels are arranged such that the cooling fins form a cooling duct.

According to a fourth aspect of the invention there is provided a housing for electrical components comprising:

a plurality of extruded panels arranged side by side for connection at side edges;

the panels being connected by longitudinal joints at the side edges to form an enclosure defined by the panels for surrounding the electrical components;

wherein some of panels have exterior slots to receive edges of a slidable face panel.

BRIEF DESCRIPTION OF THE DRAWINGS

One embodiment of the invention will now be described in conjunction with the accompanying drawings in which:

FIG. 18 is an exploded view of an alternative construction for use in forming a post.

In the drawings like characters of reference indicate corresponding parts in the different figures.

DETAILED DESCRIPTION

Figure 1:
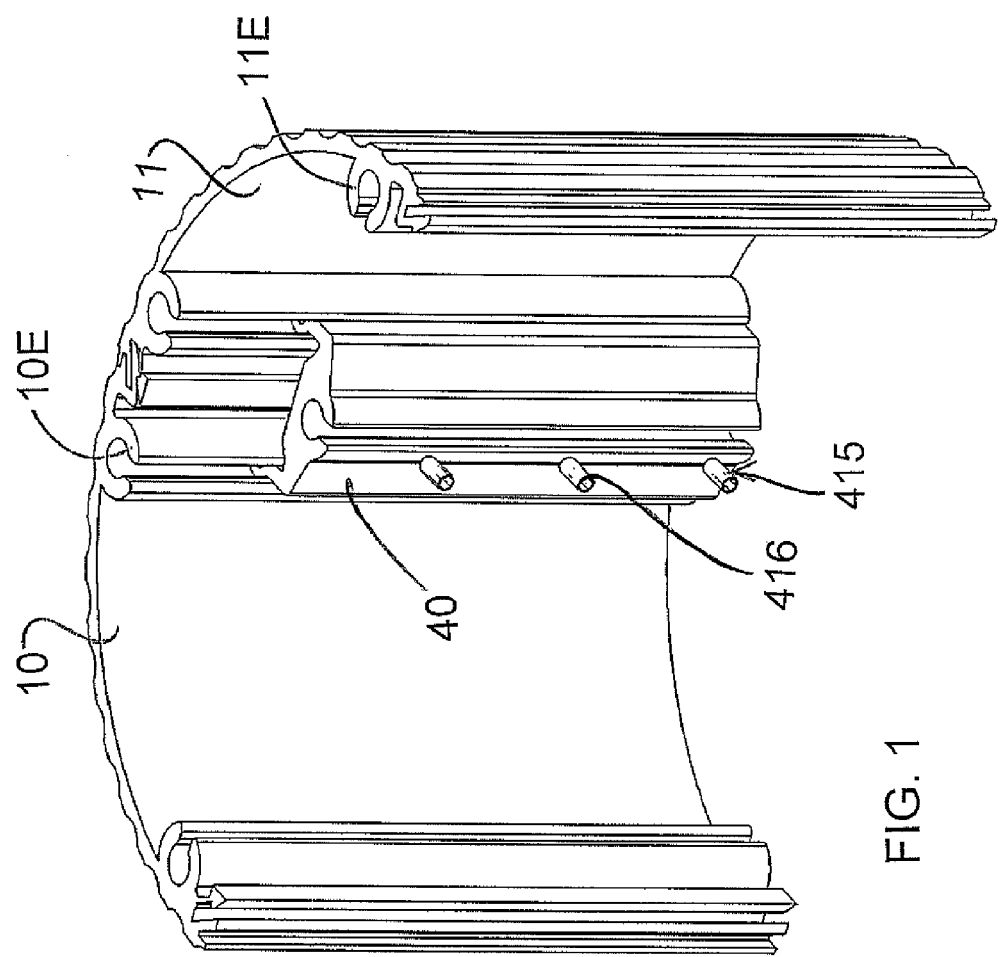
FIG. 1 is an isometric view of a joint between two extruded members for forming a housing according to the present invention.
Figure 2:
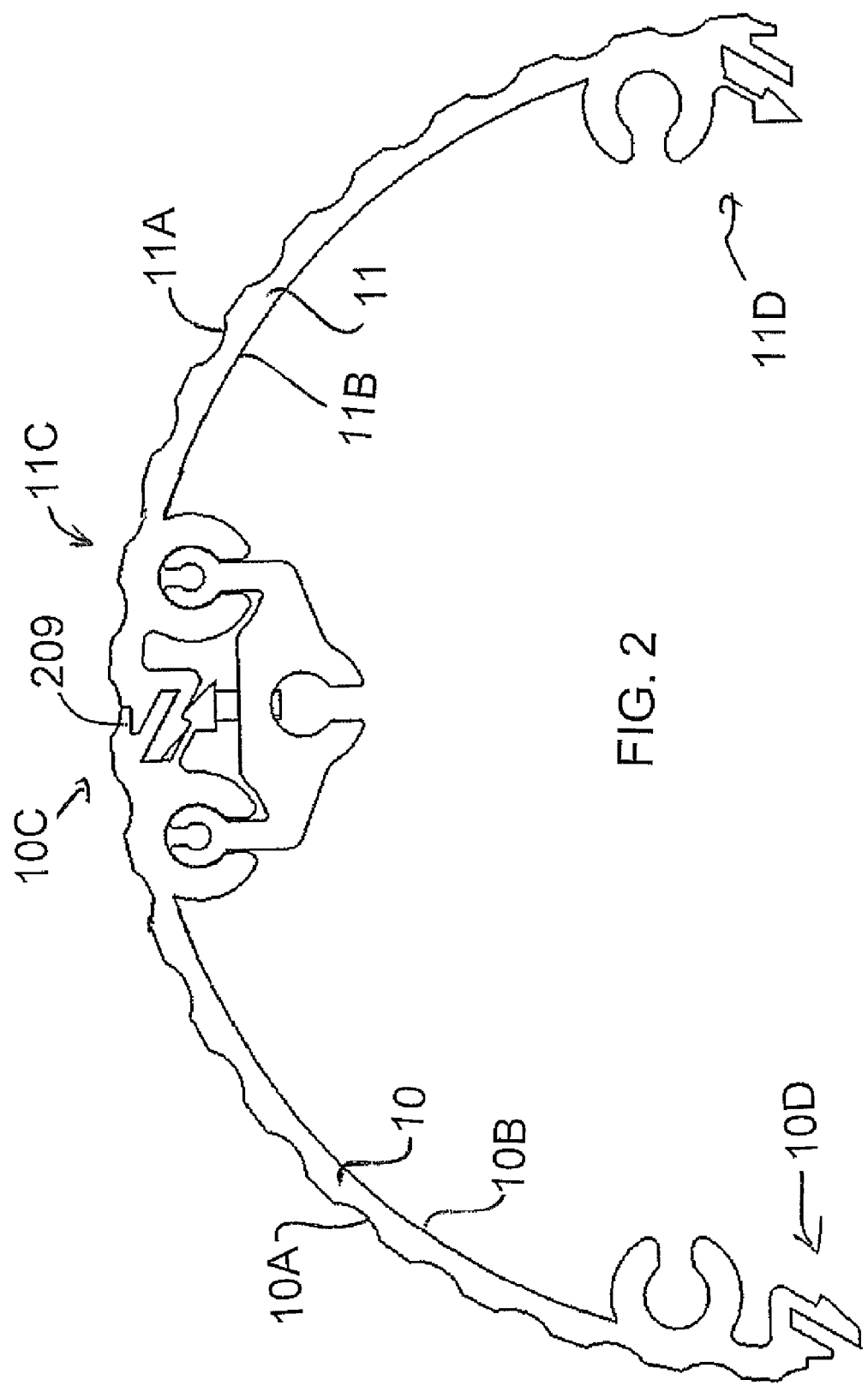
FIG. 2 is a top plan view of the joint of FIG. 1.
Figure 3:
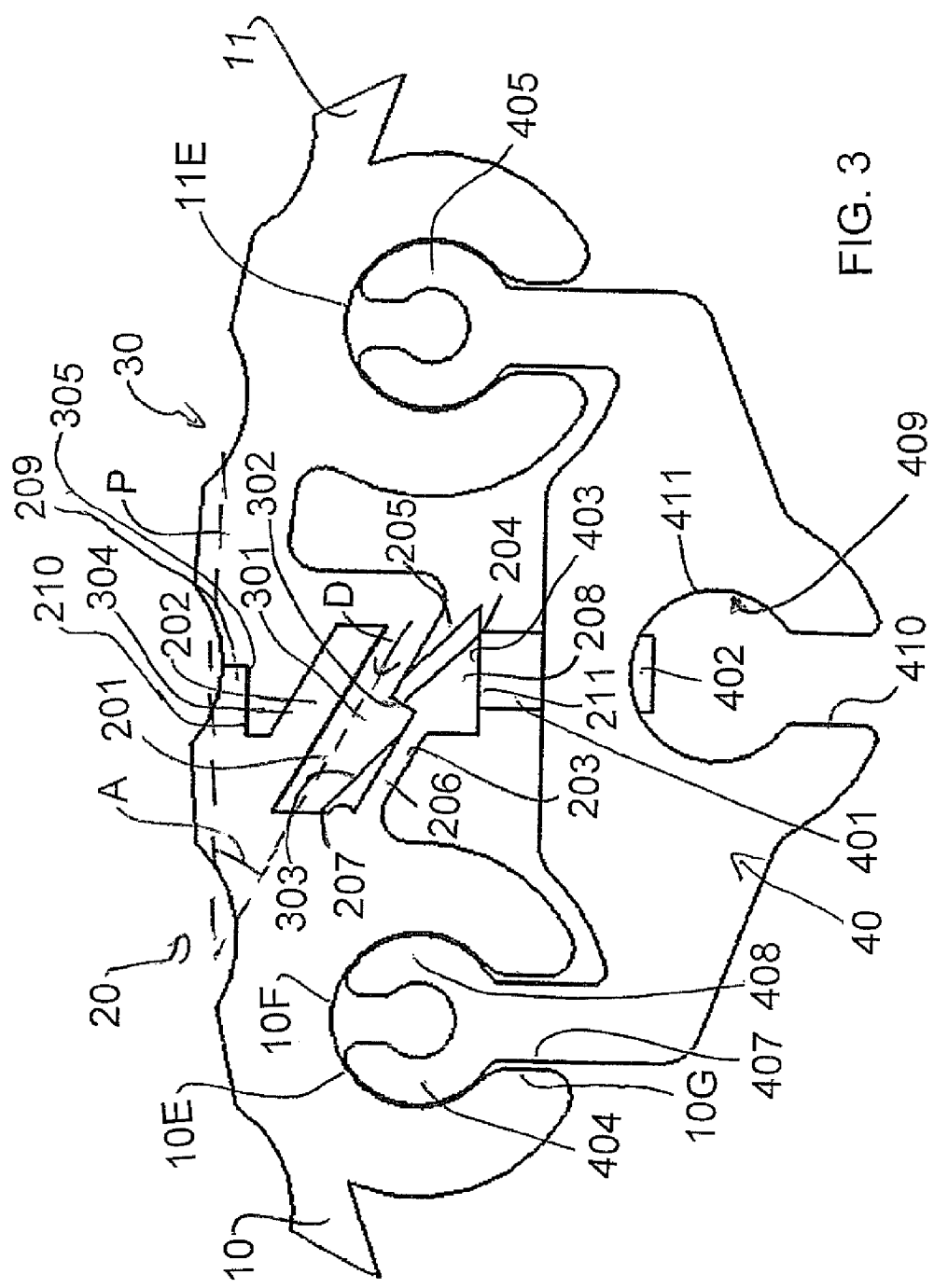
FIG. 3 is a top plan view of one portion only of the joint of FIG. 1 on an enlarged scale.

The embodiments of the housing shown in FIGS. 4 to 18 are described in more detail hereinafter. These arrangements of housing use the joint according to the present invention which is shown in FIGS. 1 to 3. This is formed between a first extruded member 10 having an outside surface 10A, an inside surface 10B and a first side edge 10C and a second extruded member 11 having an outside surface 11A, an inside surface 11B and a second side edge 11C. The first side edge 10C and second side edge 11C are arranged to provide cooperating connections for connecting the side edges of the members together to form a connected structure.

The extruded members can be of any construction and typically include a second side edge 10D on the member 10 and a first side edge 11D on the member 11 for connection to a next extruded member so that each includes male and female side connectors at respective side edges. In this way the members can be used to form a complete housing or other structure of connected members with male and female connections as required.

The members 10 and 11 are in the embodiment curved so as to be part cylindrical but other shapes can be used as described hereinafter. The members 10 and 11 have the outer surface 10A, 11A corrugated to form an attractive appearance but this is of course not an essential requirement.

The members 10 and 11 are extruded so that they have a constant cross section along their length. The material from which they are formed can vary depending on requirements but typically is of sufficient strength and stiffness to form a structural member such as a housing, post or the like. In such a case the use of metal such as aluminum, mild coated steel or stainless steel is preferred. Thicknesses and dimensions of the walls and the snap fastening components to accommodate their functions as described hereinafter can be selected by persons skilled in the art using conventional knowledge.

The first edge 10C thus has a first cooperating connection member 20 and the second edge 11C thus has a second cooperating connection member 30 with each extending along the first and second edges respectively. The members 20 and 30 form cooperating male and female connections by which the first edge 10C is fastened to the second edge 11C along the length of the edges.

As best shown in the enlarged view of FIG. 3, the first connection member 20 includes a slot 201 defined by an outer wall 202 and an inner wall 203. The second connection member 30 includes a blade member 301 to be inserted into the slot 201 in a snap fastening action.

The blade member 301 is relatively stiff and is not intended to flex. The blade member 301 has a ramp surface 303 leading to a shoulder 302 on the side thereof adjacent the outer wall 203. The inner wall 203 includes a cooperating shoulder 204 so that when seated the shoulders sit in engagement at an angle generally at right angles to a direction D of insertion of the blade into the slot so as to hold the blade inserted into the slot against movement opposite to the direction D. In order to allow the insertion, the wall 203 is flexible to allow the shoulders 302 and 204 to pass by the wall 203 flexing away from the blade when pressed inwardly by the ramp surface 303 sliding over an inlet surface 205 of the wall 203.

In order to allow the flexing of the inner wall 203, the inner wall 203 has a thinner portion 206 at a base end 207 of the slot 201 and a wider portion 208 at the outer end of the slot 201 at the surface 205 with the wider portion defining the shoulder 204.

The slot 201 and the blade 301 are inclined at an angle A to a plane P at the outer surface of the first and second extruded members at the joint. The angle A is of the order of 30 degrees but can be larger and as much as 45 degrees.

The second connection member 30 includes a second slot 304 parallel to the slot 201 in the first connection member and arranged to receive the outer wall 202 of the first connection member. As the slot 304 is parallel to the slot 201, these slots define the direction D of insertion at the angle A to the plane P.

The first connection member 20 includes an overlapping rib portion 209 at the outer surface 10A which engages onto the outer surface 11A of the second of the extruded members. In order to receive this rib portion and still provide a flush or contiguous outer surface at the junction between the surfaces 10A and 11A, the surface 11A includes a recess 305 which matches the rib. Both the recess 305 and the rib 209 include a side surface 210 which is parallel to the plane P so that the insertion of the overlapping rib portion 209 into the recess 305 is parallel to the plane P and the outer surfaces at the joint.

The use of the inclination angle A as opposed to being just a straight tongue and groove is that:

a) In order for the joint to fail and come apart it requires the extruded members move apart one form the other in two directions, not just movement one apart from the other, but also one moving up as the other moves down.

b) As well the idea of the angle increases surface area of the joint therefore creating a stronger joint.

c) The increased surface area of the connecting joint increases the water resistance of the joint due to the increased distance, and opposing angle, of the likely flow the water would have to travel in order to compromise the joint.

d) Also in assembly of the joint the visual clue to a tight joint is easier to ascertain as one extrusion is set higher than the other if the joint is not properly connected.

As the snap action of connecting the connection members 20 and 30 is based on the flexing of the thinner portion 206 of the wall 203, this can be locked by providing a retention member 401 of a bridging member 40. The retention member 401 is a set screw with a head 402 and a front face 403 for contacting the outer wall 203 to hold the outer wall against flexing so that compression of the outer wall 203 acts to squeeze the blade member 301 in the slot 201 and prevent the blade from being pulled out of the slot due to the engagement of the shoulders 204 and 302. For this purpose, the outer wall 203 at the wider portion 208 includes a surface 211 which is parallel to the plane P and thus to the outer wall and thus butts flush against the front face 403 of the screw 401.

The bridging member 40 spans the joint and is supported by the first and second extruded members at its respective ends. Thus the first and second extruded members 10, 11 each include a receptacle 10E, 11E for receiving insert portions 404, 405 of the bridging member such that the bridging member bridges the joint inside the inside surface to hold the joint against spreading. Each receptacle 10E, 11E forms a part cylindrical slot with a part cylindrical inner wall 10F and an open mouth 10G narrower than the wall. The insert portions include a neck 407 and a compressible bead 408 which can be snapped into the receptacle by compression of the bead so that the outside surface of the bead matches the cylindrical surface 10F. The bridging member can extend substantially along the full length of the first and second extruded members and can slide into place along the first and second extruded members. The necks 407 extend generally at right angles to the surface or to the plane P so that tension tending to allow the joint to part is communicated at right angles to the neck and through the bridging member itself so that the bridging member resists the movement of the joint apart and thus acts as a lock. The bridging member extends across the joint close to the inner surface of the joint at the wall 203 and thus provides a support for the joint without significantly interfering with the area inside the structure. The bridging member includes a longitudinal slot 409 with a mouth 410 and a part cylindrical receptacle 411 for attaching components inside the structure.

Each of the receptacles 10E, 11E and 409 is of the type which can receive a screw fastener engaged into the end of the part cylindrical wall inserted longitudinally into one end of the slot.

The bridging member 40 can also be used, as shown in FIG. 1, to form a support 415 for components located inside the panels using mounting pins 416 carried on the member 40 or by other mounting elements using for example the receptacle 409.

Figure 14:
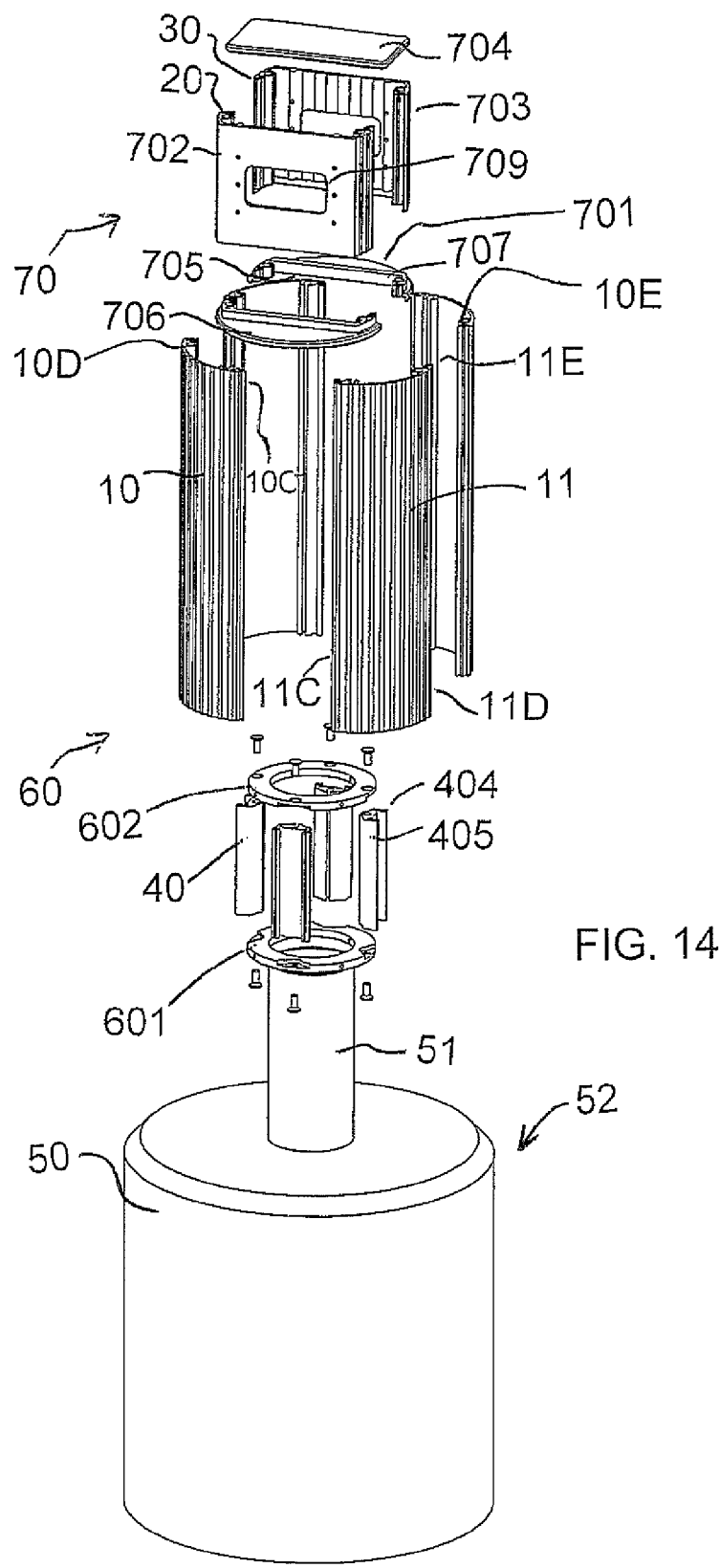
FIG. 14 is an exploded view of one embodiment of a housing according to the present invention using the components of the previous figures to define a post section and a top housing on top of the post.

Turning now to the construction of housing for electrical components formed using the panels and joint construction described above and shown in the further figures, in FIG. 14 particularly is shown a construction for mounting a housing for the electrical components (not shown). The construction comprises a concrete base 52 defined by a footing portion 50 and a cylindrical upstanding portion 51. These are typically mounted in or on the ground as a structural base for the housing construction and can be of any shape or arrangement dependent on the number of housings to be mounted and the terrain on which they are to be mounted.

The housing construction includes a post 60 attached to the portion 51 and a top receptacle section 70. The electrical components can be mounted in one or both of the post and receptacle depending on the construction and size of the components. Typically an electrical supply and optionally communication cables will pass through the base 52 into the post for supplying the electrical components.

The post 60 comprises a plurality of extruded panels 10, 11 connected by joints at edges 10C and 11C. A bridging member 40 spans the joint. All these components are of the construction described above so that it is not necessary to repeat that description here. Thus each of the panels has a male connection member 30 along a first side edge and a female connection member 20 along a second side edge for connection of the male members with the female members as previously described. Thus the male connection member provide a snap fastening into the female connection member by insertion in a direction of the blade 301 into the slot 201 at right angles to the edges to form a joint therebetween. Thus the panels 10 and 11 cooperate to form a cylindrical enclosure forming a post defined by the panels for surrounding the electrical components.

At each joint is provided a respective one of the plurality of bridging members 40 each bridging the panels at a respective one of the joints between panels. Each of the panels includes the receptacle 10E, 11E for receiving the insert portions 404, 405 of the bridging member 40 such that the bridging member bridges the joint inside an inside surface of the housing to hold the joint against spreading. The bridging members 40 extend along the full length of the panels 10, 11 and slide into place along the panels.

Figure 17:
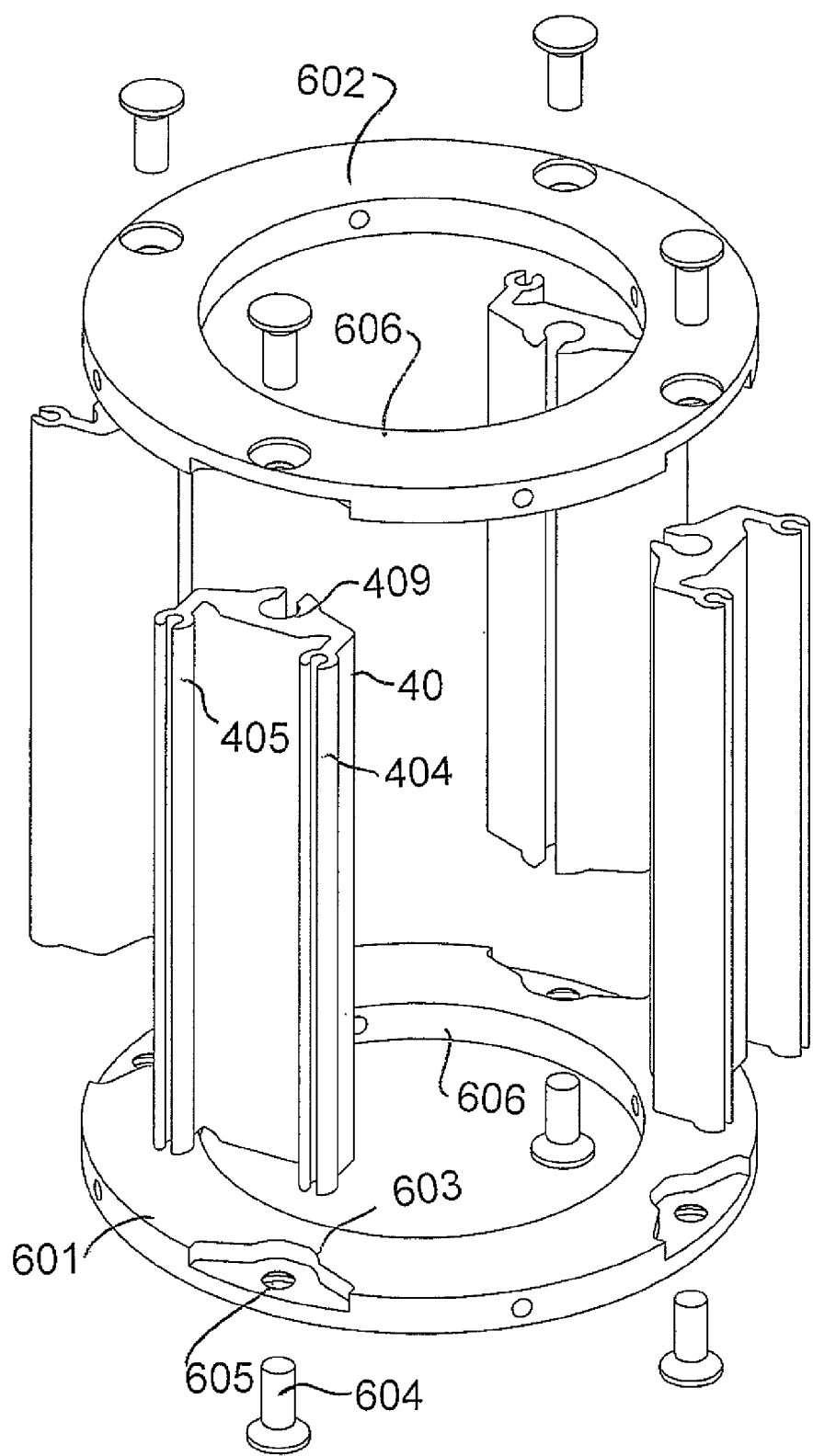
FIG. 17 is an exploded view of an internal construction of the post of FIGS. 14 and 15.

The post 60 further includes, as best shown in FIG. 17, a bottom end plate 601 and a top end plate 602 at right angles to the panels. Each bridging member is connected at one end to a support member or plate 601 and at the other end to the plate 602 extending generally at right angles to the panels so as to provide a connection between the panels and the support members or plates 601, 602. Thus the plates and the bridging members form a structural member for holding the panels 10, 11 in place.

Each plate 601, 602 includes a recess 603 indented onto the face receiving the bridging member and shaped to match the inner face of the bridging member 40 at the receptacle 409 therein. Thus the end face of the bridging member sits in the recess 603 and is prevented from movement relative to the end plate by this recess. The bridging member is fastened to the plate by a screw 604 engaged though holes 605 in the end plate at the recess 603 which screws engage into the end of the part cylindrical receptacle 409 as a screw fit to tighten the bridging member against the end plate.

Thus the bridging members are connected at each end to a respective one of two end support member extending generally at right angles to the panels so that the two end support members and the bridging members form a supporting structure inside the panels. The panels are then connected on the outside of this structure by engaging their joints and by attaching the bridging members, by sliding the connected panels along the supporting structure. The end plates 601 and 602 have a central hole 606 allowing the insertion of the electrical components and/or the connection leads.

The bottom plate 601 is fastened to the portion 51 by suitable fasteners (not shown). The top plate forms a support for a base 701 of the receptacle 70.

In FIG. 14, the receptacle 70 is relatively small and is formed by two panels 702 and 703 connected by edge connection joints 20 and 30 as previously described. Additional panels in the manner of FIG. 4 can also be provided depending on the size of the receptacle required. The bottom plate 701 is formed in two sections 706 and 706 with a hole 707 which is connected by edge connectors 20 and 30 as previously described. The bottom plate is fastened to the panels 702 and 703 by screws extending through the plate into the ends of the receptacles 10E and 11E (FIG. 3). A top plate 704 forms a closed top formed in one piece and fastened to the panels 702 and 703 by screws (not shown). Each of the panels 702 and 703 includes a hole 709 through the wall thereof to access the interior so that an electrical outlet of a conventional construction can be mounted in the wall to allow connection of a plug from a vehicle or the like, with the electrical connection to the internal electrical components passing through the wall to the interior. In this embodiment most of the electrical components are housed in the pose and the top receptacle is primarily merely a support for the electrical outlets.

Figure 15:
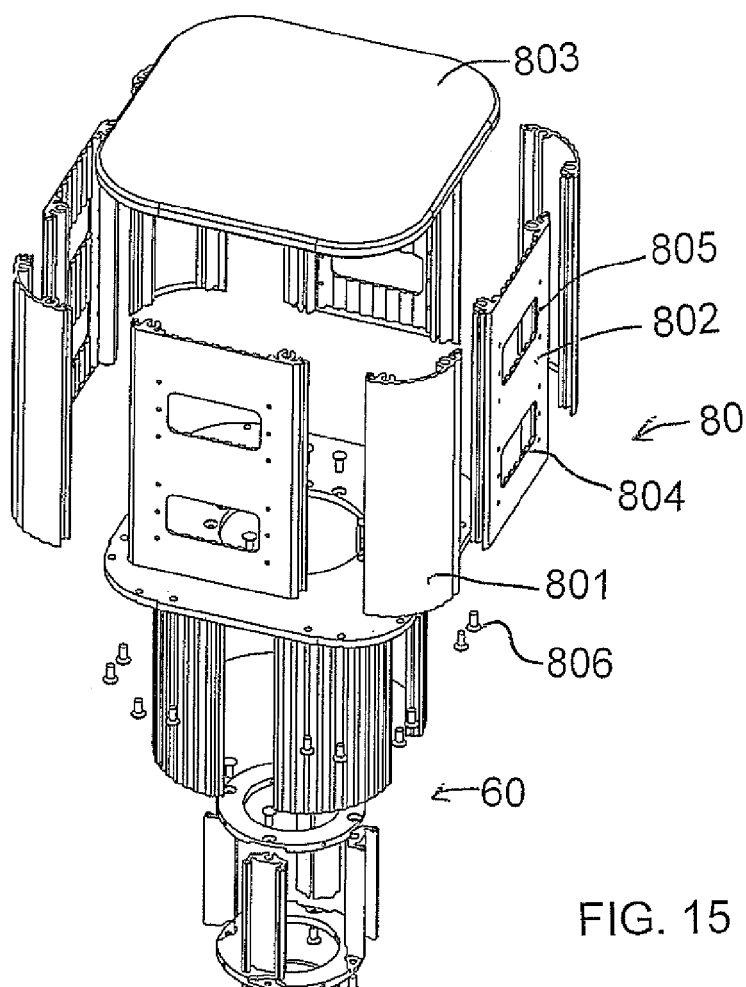
FIG. 15 is an exploded view of a second embodiment of a housing according to the present invention using the components of the previous figures to define a post section and a top housing on top of the post.
Figure 15:
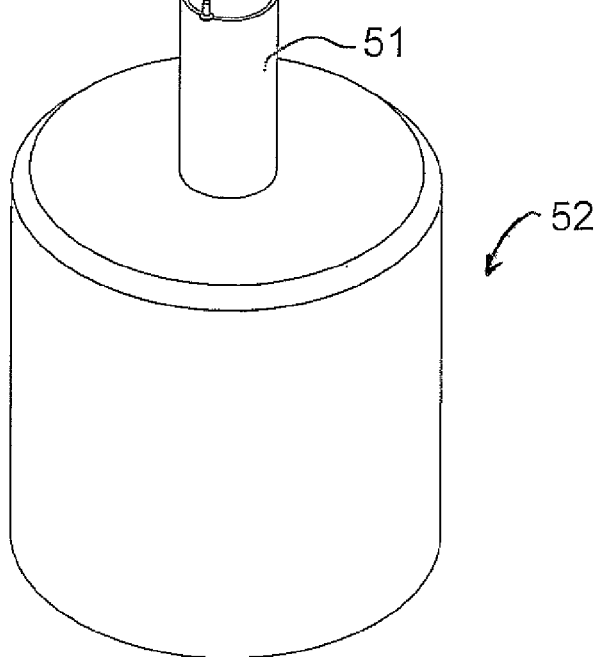

In FIG. 15 is provided a similar arrangement in which there is provided a base 52, a post 60 and a receptacle 80. In this case the receptacle is much larger and is intended to contain all of the electrical components. In this case the receptacle is formed of panels 801 and 802 and a top plate 803 all forming a generally rectangular construction with vertical sides. The panels 801 are curved to form corners of the receptacle. The panels 802 are flat and include holes 804, 805 for electrical outlets. In this arrangement the bridging members 40 are omitted from the receptacle and the fastening of the panels to the top and bottom plates is effected solely by the insertion of screws 806 into the receptacles 10E, 11E.

Figure 16:
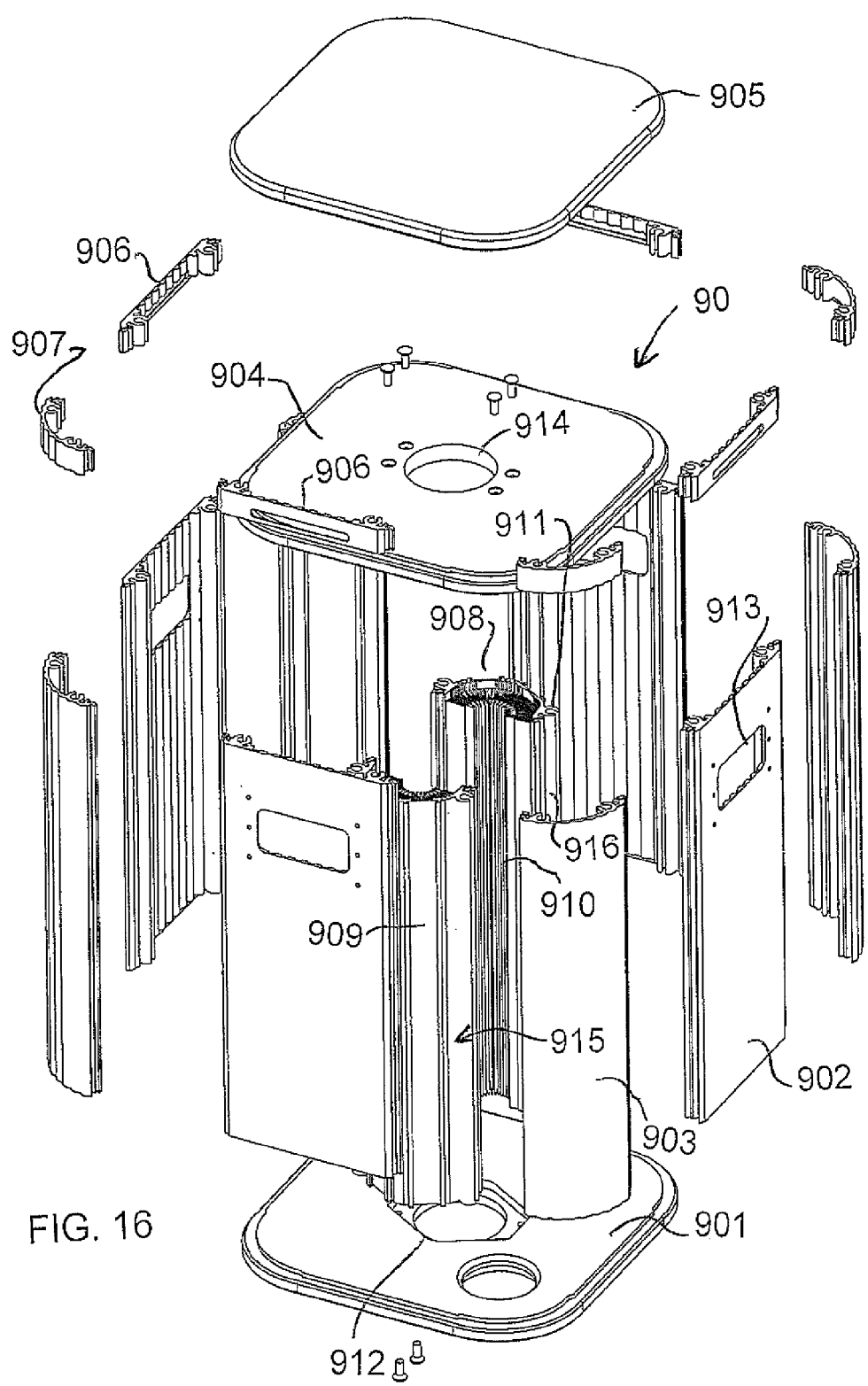
FIG. 16 is an exploded view of a third embodiment of a housing according to the present invention using the components of the previous figures to define a housing with a central cooling duct.

Turning now to FIG. 16, there is shown a further arrangement of receptacle 90 which can be mounted on a post or directly in a ground base. A base plate 901 and a top plate 904 is connected to flat panels 902, with holes 913, and corner panels 903 in the manner previously described.

In this embodiment there is provided a cover plate 905 mounted on top of the top plate 904 and held spaced from it by spacer panels 906 and 907 around the edge. The panels 906 and 907 match in shape the panels 902 and 903 and attach in similar manner. A cooling duct 915 extends through the receptacle 90 from a bottom hole 912 in the plate 901 to a top hole 914 in the plate 904. The cooling duct is formed of two connected panels 909 and 909 using joints 916 and receptacles 911 as previously described. The surface of the panels 908 and 909 carries cooling fins 910. These extend outwardly from the surface of the respective panel and can project to the interior or the exterior of the duct 915, but preferably extend to the interior so as to engage air passing though the duct. The air flow is caused by convection and thus enters the duct through the bottom hole 912 and escapes the duct through the top hole 914 into the area between the top late 904 and the cover plate 905. The panels 906 have holes to allow the escape of the air. Thus the panels can be used to effect cooling of the electrical components in locations where significant ambient heat can cause overheating. Thus in this embodiment, the panels 908 and 909 are arranged such that the cooling fins form a cooling duct on an inside of the housing.

Figure 10:
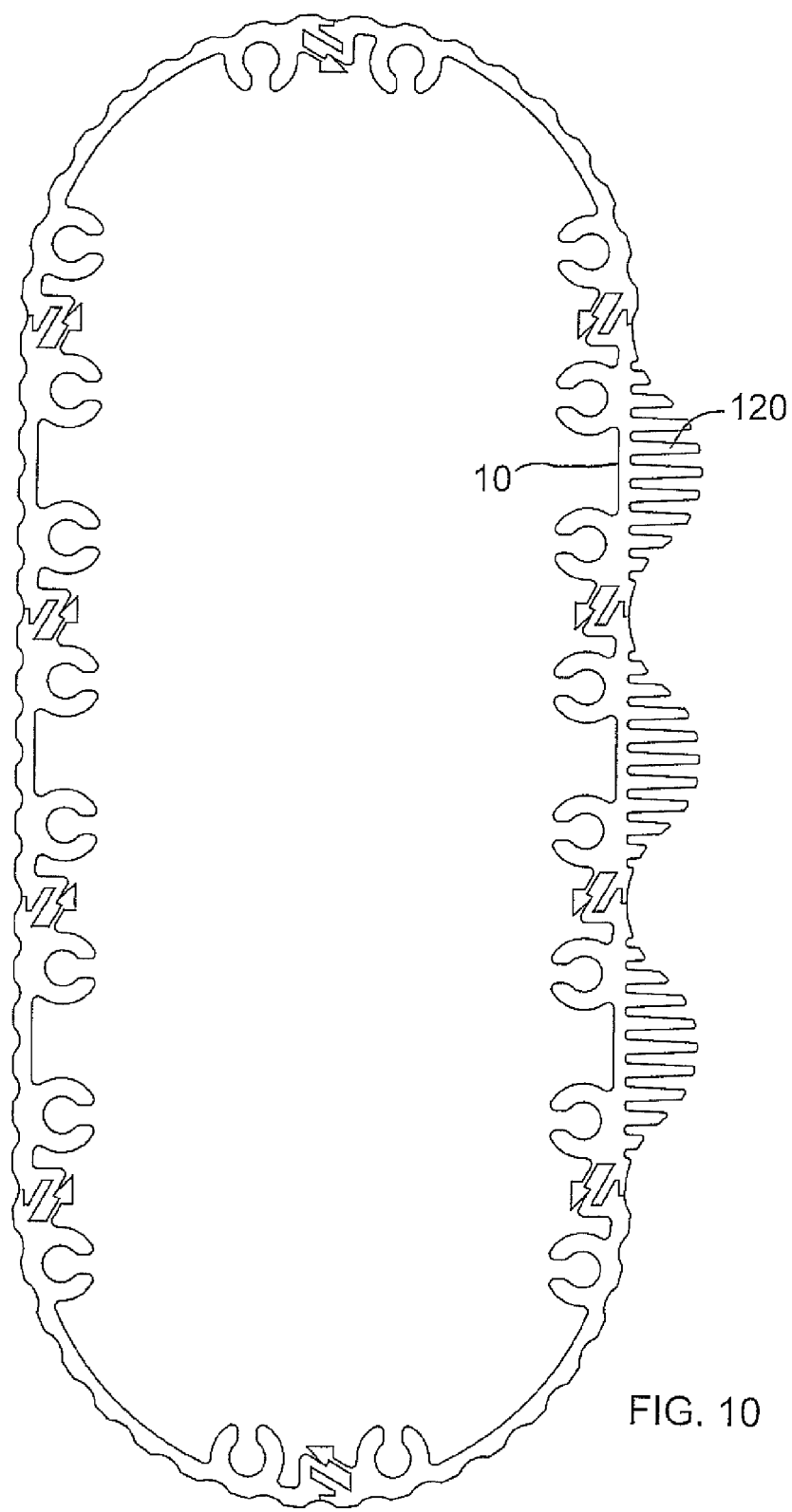

As shown in FIG. 10, at least one of the panels carries a plurality of cooling fins 120 on the exterior extending generally outwardly therefrom.

Figure 12:
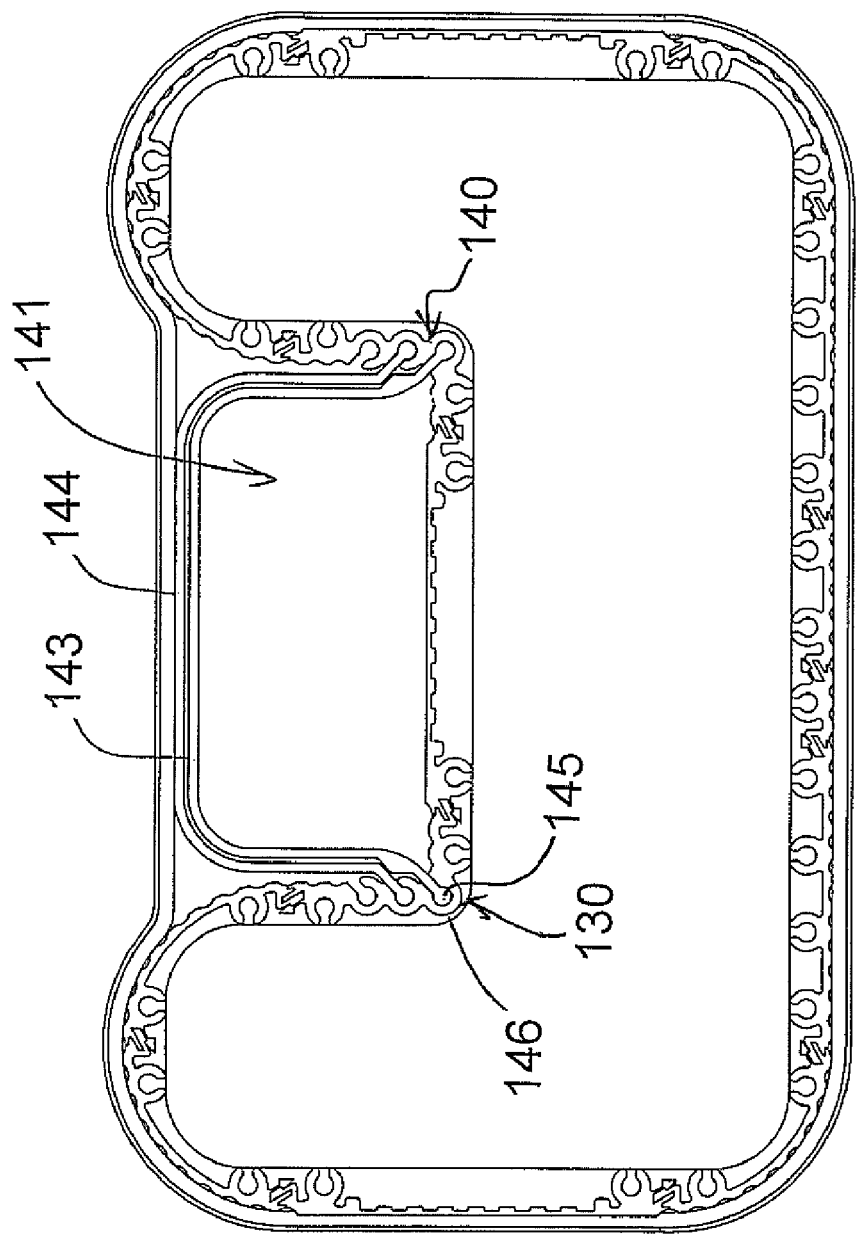
Figure 13:
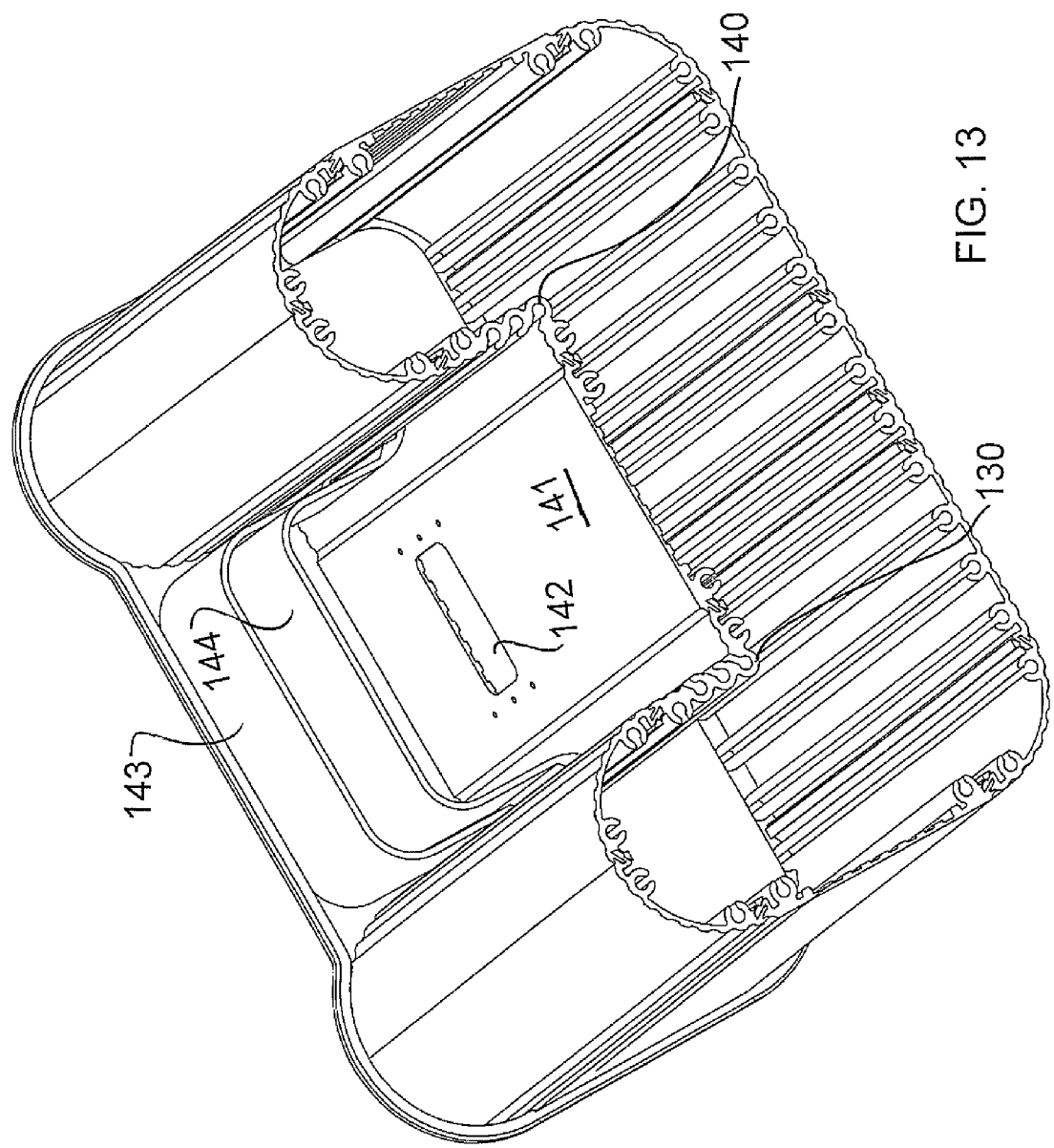
FIG. 13 is an isometric view from the bottom and the front of the housing of FIG. 12.

As shown in FIGS. 12 and 13 some of panels 130 and 140 are shaped so that they are generally concave so as to form an interior corner defining a recess 141 which has a hole 142 for the mounting of an outlet. Thus the hole 142 is protected in a recess and is not presented merely on the outside as previously described. This allows some protection for the hole by way of a cover 143 and a sliding front panel 144. Both the cover 143 and the panel 144 have edge beads 145 mounted in receptacles 146 on the panels 130 and 140 thus defining exterior slots to receive edges of the slidable face panel.

Figure 4:
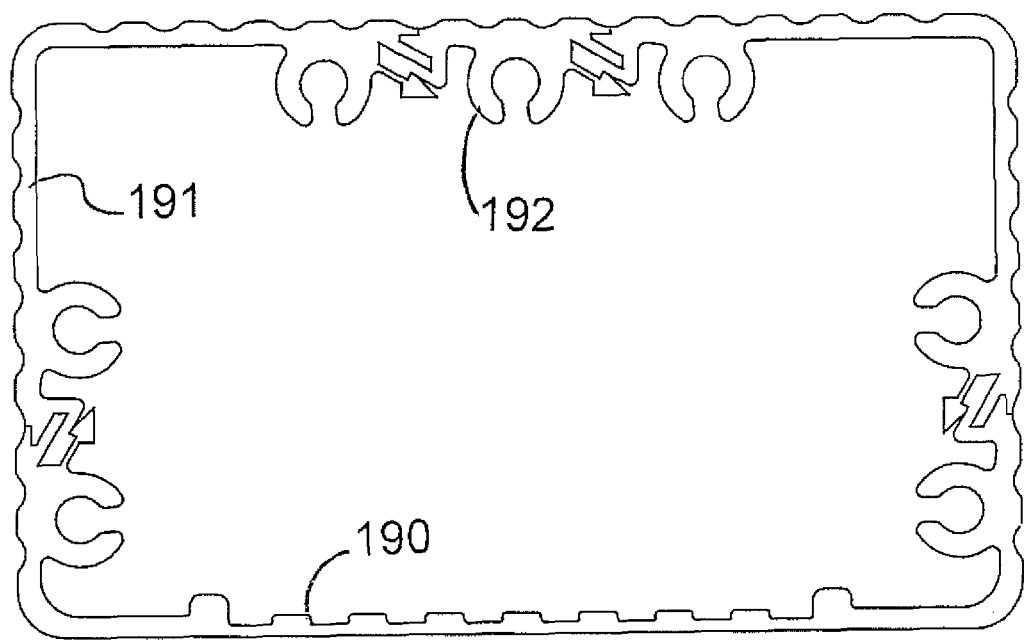
FIGS. 4 to 12 are a series of top plan views of different housing shapes which can be formed by a series of different extruded panels.

As shown in FIGS. 4 to 12, the housing includes panels of different cross section. Thus as shown in FIG. 4, some of the panels 190 are generally straight or flat in cross section and some 191 form corners. A short connector panel 192 can also be provided.

Figure 5:
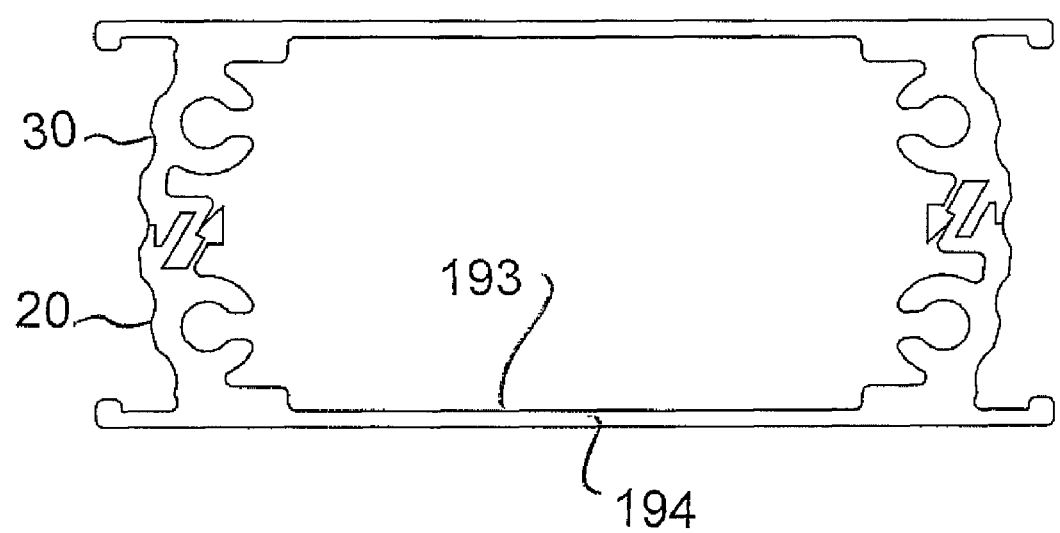

Thus as shown in FIG. 5, some of the panels 193 define a flat plate 194 with the connectors 20 and 30 extending at right angles to the rear face of the flat panel.

Figure 6:
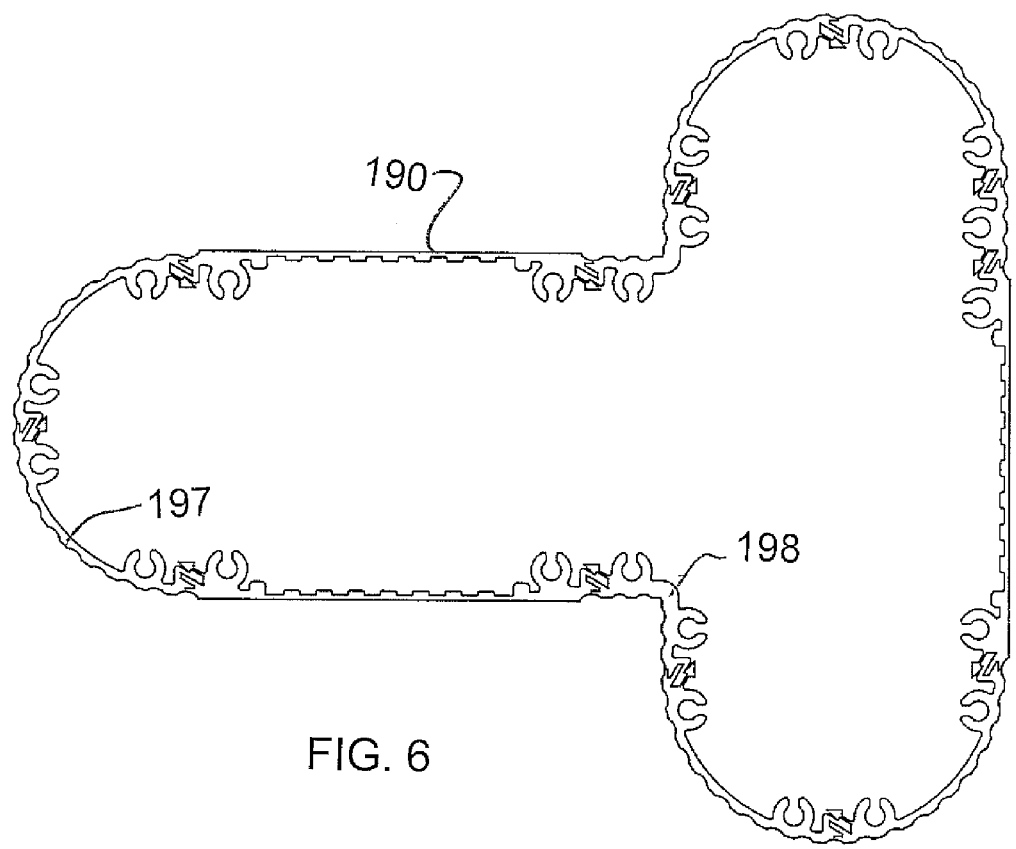

In FIG. 6, a T-shaped cross section is formed using flat panels 190, part cylindrical panels 197 and inverted corner panels 198.

Figure 7:
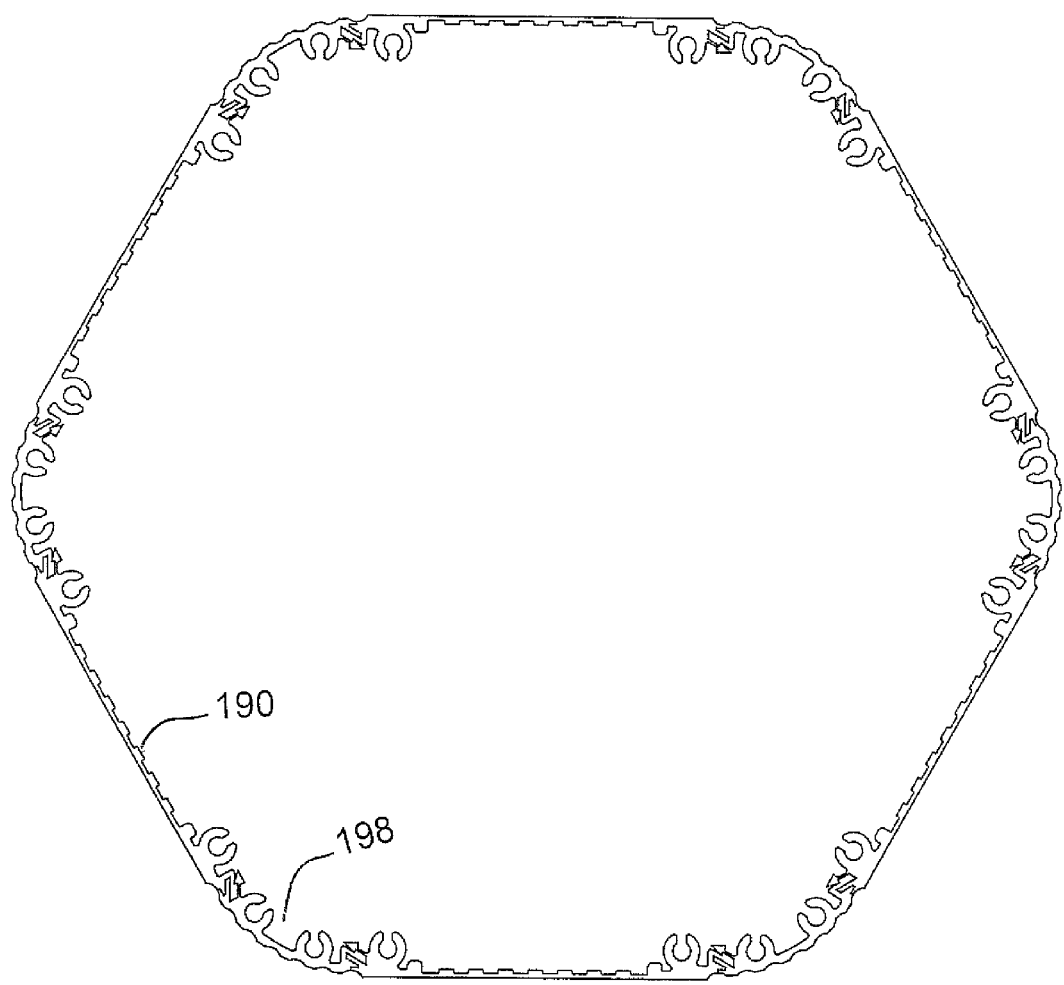

In FIG. 7, a hexagonal cross section is formed using flat panels 190, and short 60 degree connector panels 198.

Figure 8:
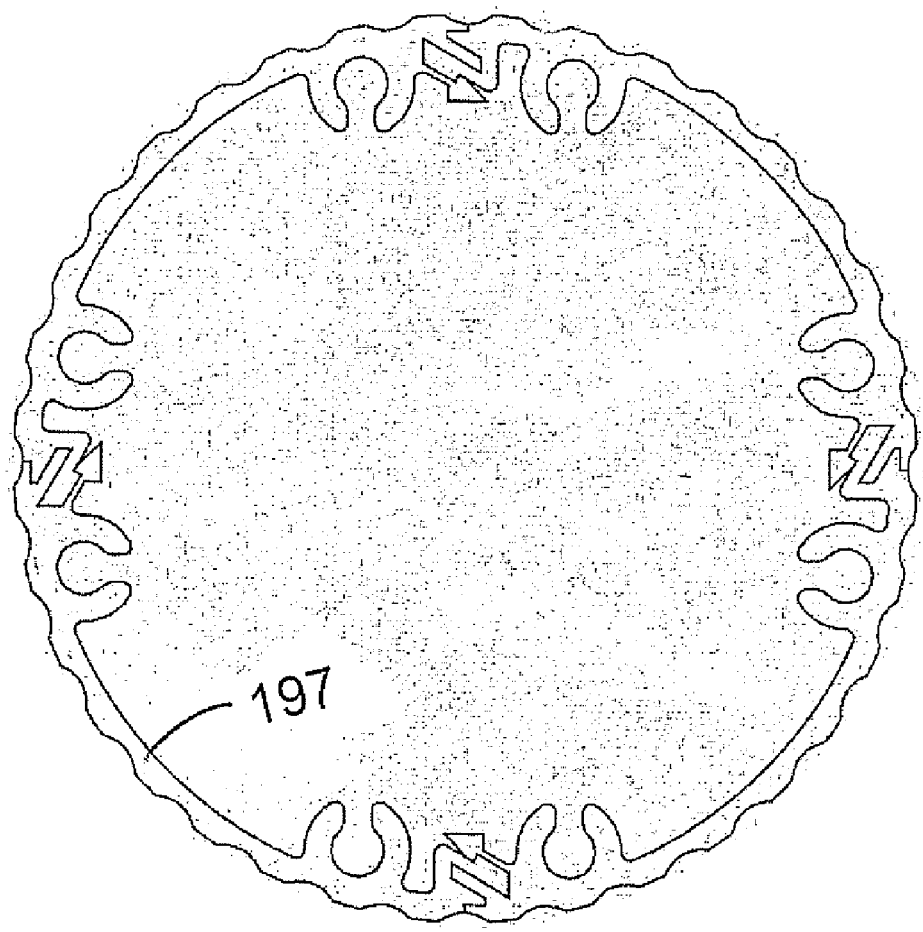

In FIG. 8, a circular cross section is formed using four part cylindrical panels 197.

Figure 9:
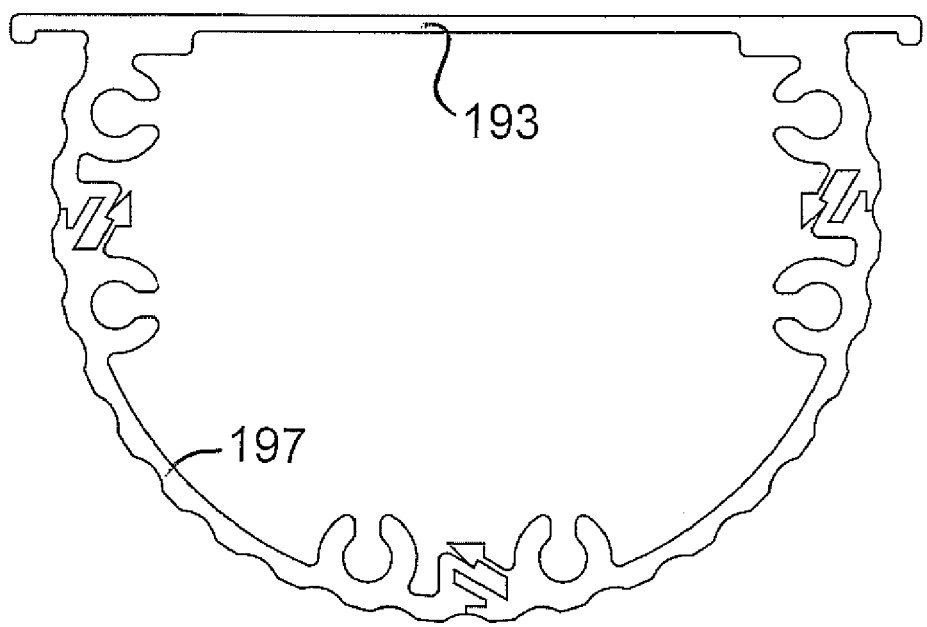

In FIG. 9, a D-shaped cross section is formed using part cylindrical panels 197 and flat plate panels 193.

In FIG. 10, an oval cross section is formed using part cylindrical panels 197 and short connector panels 198.

Figure 11:
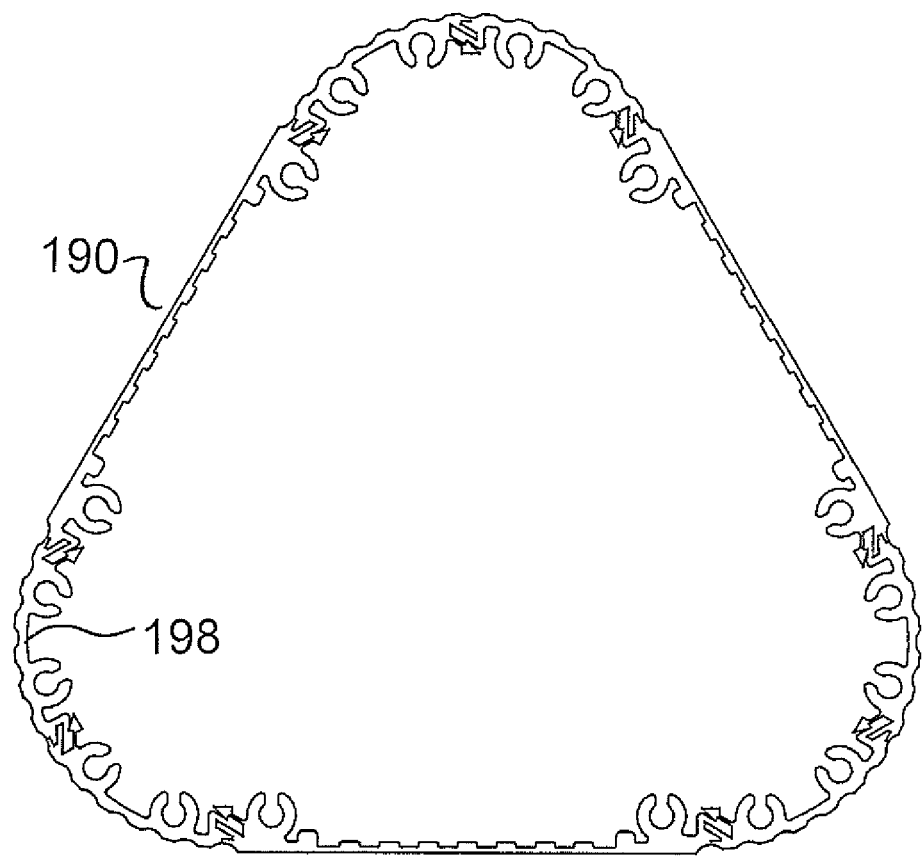

In FIG. 11, a triangular cross section is formed using straight panels 190 and short connector panels 198.

This construction to form different cross sections is obtained since the male connection members of each of the panels are of identical cross section and the female connection members of each of the panels are of identical cross section.

FIG. 18 shows a modification of the arrangement of FIG. 17 where the recesses 621 for the end of the bridging members 40 are spaced inwardly from an outer edge 624 of the plate 620 so that the panels 10 and 11 (not shown in this figure) sit on the outer periphery of the plate rather than being located outside the plates as in FIG. 17. Thus the plate 620 fully closes the end of the housing.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A housing comprising:
a plurality of extruded panels arranged side by side for connection at side edges;
each of the panels having a male connection member along a first side edge and a female connection member along a second side edge;
the male connection member being a snap fastening into the female connection member by insertion in a direction at right angles to the edges to form a joint therebetween;
the panels cooperating to form an enclosure defined by the panels for surrounding housed components;
wherein there is provided a plurality of bridging members each bridging the panels at a respective one of the joints between panels;
and wherein the panels each include a receptacle for receiving insert portions of the bridging member such that the bridging member bridges the joint inside an inside surface of the housing to hold the joint against spreading.

2. The housing according to claim 1 wherein the housing includes panels of different cross section.

3. The housing according to claim 2 wherein some of the panels are generally straight in cross section.

4. The housing according to claim 2 wherein some of the panels are generally curved in cross section.

5. The housing according to claim 1 wherein the male connection members of each of the panels are of identical cross section and the female connection members of each of the panels are of identical cross section.

6. The housing according to claim 1 wherein the panels are formed of an extruded metal.

7. The housing according to claim 1 wherein the bridging member extends substantially along the full length of the panels.

8. The housing according to claim 7 wherein the bridging member slides into place along the panels.

9. The housing according to claim 1 wherein the bridging member forms a support for components located inside the panels.

10. The housing according to claim 1 wherein the bridging member is connected at one end to a support member extending generally at right angles to the panels so as to provide a connection between the panels and the support member.

11. The housing according to claim 10 wherein the support member is an end plate.

12. The housing according to claim 11 wherein the bridging member is connected at each end to a respective one of two end support member extending generally at right angles to the panels so that the two end support members and the bridging members form a supporting structure inside the panels.

13. The housing according to claim 1 wherein the bridging member is fastened to the support member by a screw through the support member engaging into a channel extending longitudinally of the bridging member.

14. The housing according to claim 1 wherein the panels are connected to form an upstanding elongate post.

15. The housing according to claim 1 wherein the panels are connected to form a receptacle on top of a post.

16. The housing according to claim 1 wherein some of panels have exterior slots to receive edges of a slidable face panel.

17. The housing according to claim 1 wherein some of panels are shaped so that they are generally concave so as to form an interior recess.

18. The housing according to claim 1 wherein at least one of the panels has an opening for receiving an electrical outlet receptacle.

19. A housing comprising:
a plurality of extruded panels arranged side by side for connection at side edges;
the panels being connected by longitudinal joints at the side edges to form an enclosure defined by the panels for surrounding housed components;
wherein there is provided a plurality of bridging members each bridging the panels at a respective one of the joints between panels such that the bridging member bridges the joint inside an inside surface of the housing to hold the joint against spreading;
wherein the bridging member is connected at one end to a support member extending generally at right angles to the panels so as to provide a connection between the panels and the support member;
and wherein the bridging member forms a support for components located inside the panels.

20. The housing according to claim 19 wherein the bridging member extends substantially along the full length of the panels.

21. The housing according to claim 19 wherein the bridging member slides into place along the panels.

22. The housing according to claim 19 wherein the support member is an end plate.

23. The housing according to claim 19 wherein the bridging member is connected at each end to a respective one of two end support member extending generally at right angles to the panels so that the two end support members and the bridging members form a supporting structure inside the panels.

24. A housing comprising:
a plurality of extruded panels arranged side by side for connection at side edges;
each of the panels having a male connection member along a first side edge and a female connection member along a second side edge;
the male connection member being a snap fastening into the female connection member by insertion in a direction at right angles to the edges to form a joint therebetween;
the panels cooperating to form an enclosure defined by the panels for surrounding housed components;
wherein the female connection member includes a slot defined by an inner wall and an outer wall;
wherein the male connection member includes a blade member with an inner surface and an outer surface inserted into the slot;
wherein the blade member has a shoulder on the inner surface—thereof adjacent the inner wall of the slot;
wherein the inner wall of the slot includes a cooperating shoulder and is flexible to allow the shoulders to pass;
and wherein the outer surface of the blade member and the outer wall of the slot define planar wall surfaces which slide over one another as the blade member moves into the slot to guide movement of the blade member into the slot.

25. The housing according to claim 24 wherein the planar wall surfaces lie at an angle to a common outside plane of the panels at the joint to guide the movement of the blade member as it enters the slot.

26. The joint according to claim 24 wherein the inner wall of the slot has a surface parallel to a common outside plane of the panels at the joint and there is provided a retention member butting the surface parallel to the common outside plane to hold the blade member in the slot.

27. The joint according to claim 24 wherein the inner wall of the slot has a thinner portion at a base of the slot and a wider portion at an end of the slot with the wider portion defining the shoulder.

28. The joint according to claim 24 wherein the female connection member includes a second slot parallel to the planar wall surfaces and arranged to receive a blade member of the male connection member.

29. The joint according to claim 24 wherein there is provided an overlapping rib portion on the male connection member which engages into a recess on the outer surface of the female connection member.

30. The joint according to claim 29 wherein the overlapping rib portion and the recess have surface parallel to a common outside plane of the panels at the joint.

31. The joint according to claim 24 wherein there is provided a retention member contacting the inner wall of the slot to hold the inner wall against flexing to hold the blade member in the slot.

32. The joint according to claim 31 wherein the retention member is carried on a bridging member spanning the joint and supported by the male and female extruded members.

33. The joint according to claim 32 wherein the retention member is a set screw.

* * * * *